United States Patent [19]

Ängquist

[11] 4,318,167

[45] Mar. 2, 1982

[54] ELECTRICAL INVERTER WITH CONTROLLABLE OUTPUT VOLTAGE

[75] Inventor: Lennart Ängquist, Enköping, Sweden

[73] Assignee: Asea Aktiebolag, Vesteras, Sweden

[21] Appl. No.: 114,171

[22] Filed: Jan. 22, 1980

[30] Foreign Application Priority Data

Feb. 5, 1979 [SE] Sweden ............................... 7900966

[51] Int. Cl.³ ............................................ H02M 1/12
[52] U.S. Cl. ...................................................... 363/41
[58] Field of Search ............................... 363/41, 42

[56] References Cited

U.S. PATENT DOCUMENTS 3,324,376 6/1967 Hunt ........................................ 363/42
3,523,236 8/1970 Howell et al. ......................... 363/42
3,609,507 9/1971 Beck ....................................... 363/41

FOREIGN PATENT DOCUMENTS 1166812 10/1969 United Kingdom .
1166841 10/1969 United Kingdom .
1413145 11/1975 United Kingdom .

*Primary Examiner*—William M. Shoop
*Attorney, Agent, or Firm*—Pollock, Vande Sande & Priddy

[57] ABSTRACT

An electrical inverter with controllable output voltage comprises a three-phase self-commutated inverter bridge which is supplied from a d.c. voltage source. A reference signal generator generates a three-phase binary reference signal for controlling the shape of the curve of the output voltage of the inverter. This signal is modulated or mixed in a mixing stage with a binary pulse train having a controllable pulse-width ratio and a relatively high frequency. The output signal from the mixing stage is supplied to the inverter bridge in such a way that the output voltage of the inverter bridge corresponds to the product of the reference signal and the pulse train.

4 Claims, 7 Drawing Figures

ELECTRICAL INVERTER WITH CONTROLLABLE OUTPUT VOLTAGE

TECHNICAL FIELD

The present invention relates to an electrical inverter with controllable output voltage, the inverter being of the kind comprising a three-phase inverter bridge for connection to a d.c. voltage source and a control pulse means for controlling the valves of the bridge.

An inverter of this kind comprises switching members, for example thyristors provided with commutating circuits, which thyristors alternately connect each phase conductor at the output side of the inverter to the first and to the second of the two poles of the d.c. voltage source. Commutation, that is, switching of a phase conductor from one d.c. voltage pole to the other, is normally carried out once every half-cycle of the output a.c. voltage.

DISCUSSION OF THE PRIOR ART

From "IEEE Transactions on Industry Applications", Vol. IA-9, No. 3, May/June 1973, pp. 310–317, it is previously known to use, in such an inverter, a fixed control pattern with additional commutations within each half-cycle of the output voltage to reduce the harmonic content of the output voltage. Certain harmonics may then be reduced to zero. However, with the described inverter it is not possible to control the amplitude of the fundamental tone of the output voltage.

From "IEEE Transactions on Industry Applications", Vol. IA-10, No. 5, September/October 1974, pp. 666–673, an inverter is known in which the above-mentioned control method is modified. In this inverter, the times for the additional commutations are varied in such a way that the fundamental tone of the output voltage of the inverter may be controlled while at the same time certain harmonics of the output voltage are maintained at zero. However, this known inverter has considerable drawbacks. It requires complicated and non-linear control functions, which are difficult to realize. Furthermore, the harmonics which are not eliminated tend to have high amplitudes.

The purpose of the present invention is to provide an inverter of the kind referred to, in which it is possible to transform a constant d.c. voltage into an a.c. voltage with a controllable amplitude and in which, at a given commutating frequency, the harmonics of the a.c. voltage have as low an amplitude and as high a frequency as possible.

DISCLOSURE OF THE INVENTION

According to the invention an electrical inverter of the kind referred to comprises mixing members adapted to be supplied with a three-phase binary reference signal for controlling the curve shape of the output voltage of the inverter and to mix the reference signal with a binary pulse train, said binary pulse train having a controllable pulse-width ratio and a frequency which is higher than the frequency of the output voltage of the inverter, the resultant signal being adapted to be supplied to the control pulse means of the inverter bridge in such a way that the output voltage of the inverter corresponds to the product of the reference signal and the binary pulse train.

BRIEF DESCRIPTION OF THE DRAWINGS

The invention will now be described, by way of example, with reference to the accompanying drawings, in which.

DESCRIPTION OF PREFERRED EMBODIMENTS

Figure 1:
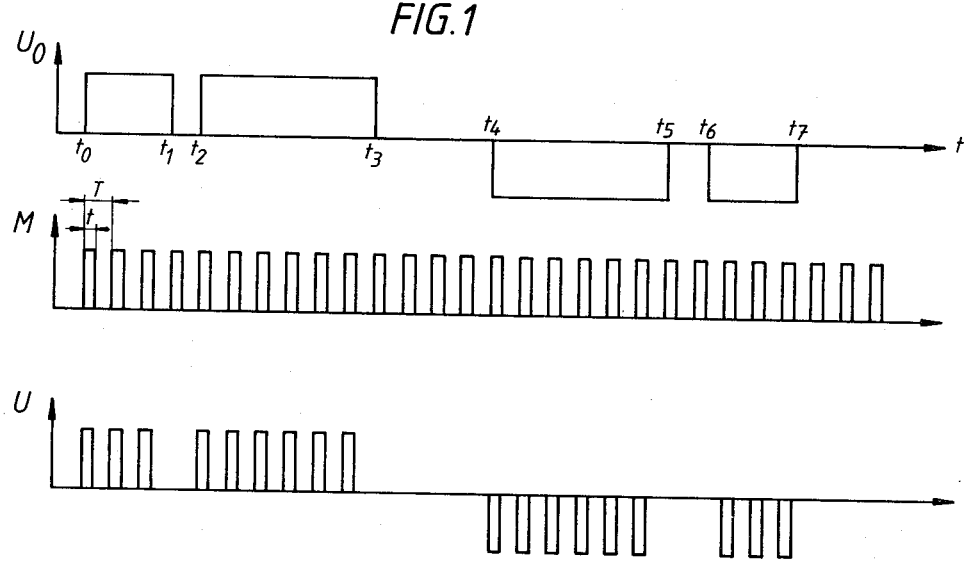
FIG. 1 is a series of graphs illustrating the principle of mixing and modulation which is the essence of the invention.

The uppermost graph in FIG. 1 shows an example of a fixed control pattern $U_O$ corresponding to one cycle of one of the three main voltages of the inverter. In a conventional manner additional commutations are performed within each half-cycle, namely at the times $t_1$ and $t_2$ and at times $t_5$ and $t_6$. Although this graph shows two additional commutations within each half-cycle, the number of additional commutations may, of course, be greater. The more additional commutations that are made, the greater will be the number of harmonics that can be reduced or eliminated in a known manner. The times for the additional commutations and the number of additional commutations are chosen so that the desired reduction of harmonics is obtained. For example, the lowest harmonics may be eliminated, which is suitable since they have the highest amplitudes and the lowest frequencies and therefore require the greatest efforts for the filtering of the output voltage. Alternatively, the fixed control pattern may be designed such that the additional commutations give an optimization of some other criterion, for example a minimization of the total harmonic content of the inverter current or voltage. In the output voltage of a three-phase inverter, the harmonics whose ordinal numbers are even as well as the harmonics whose ordinal numbers are a multiple of three, are normally missing. Normally, therefore, only the harmonics with the ordinal numbers 5, 7, 11, 13, 17, etc. need be taken into consideration.

With this fixed control pattern, a good shape of the curve of the output voltage may be obtained, but the amplitude of the output voltage cannot be controlled. According to the invention, the output voltage amplitude may become controllable by modulating (mixing) the fixed control pattern $U_O$, which may be said to constitute a reference signal, with a high-frequency modulating signal (M in FIG. 1) having a controllable pulse-width ratio. The modulation means that the output voltage (U in FIG. 1) of the inverter at each moment constitutes the product of the reference signal and the modulating signal. When the modulating signal is "1", the output voltage from the inverter corresponds to the reference signal, and when the modulating signal is "0", the output voltage is zero.

The above-described method combines the advantages of the harmonic-reducing fixed control pattern with a continuously controllable output voltage, the fundamental tone amplitude of which may be varied in a stepless manner by varying the pulse-width ratio of the modulating signal.

The pulse-width ratio $\alpha$ is the quotient $t/T$ between the pulse length and the period of the modulating signal. By varying $\alpha$ between 0 and 1, the output voltage can thus be controlled continuously between zero and full voltage. When the fundamental tone amplitude is reduced by this method from full value, the amplitudes of the non-eliminated harmonics are also reduced to a corresponding extent, which is a considerable advantage compared with previously known systems.

By the mixing and modulating method, additional harmonics are introduced in the output voltage. If the modulating frequency is $\omega_c$, these harmonics will consist of harmonic spectra with the mid-frequencies $\omega_c$, $2\omega_c$, $3\omega_c$, etc. If $\omega_c$ is considerably higher than the frequency of the output voltage of the inverter, these harmonics, introduced by the modulation, will have high frequencies and they may therefore be easily removed by a small filtering effort.

In a three-phase inverter having an output frequency of 50 Hz, $\omega_c$, for example, may have a value of from 500 to 1000 Hz. In an inverter with controllable output frequency $\omega_c$ may be variable or constant. At a higher output frequency, $\omega_c$ may suitably be synchronized with the output frequency so that it becomes a multiple of the output frequency, whereas at a low output frequency, for example below one or a few Hz, $\omega_c$ may be synchronous or asynchronous.

In an inverter with controllable output frequency, the frequency of the harmonics is proportional to the fundamental tone frequency. When the latter is low, the harmonics therefore have a low frequency. It is then more difficult to filter off the harmonics and, for example in the case of operation by a motor, they have adverse effects on the mechanical system. Therefore, the above-mentioned additional commutations may possible be used only at low frequencies, for example frequencies below 20% of the maximum frequency, while the additional commutations may be omitted at higher frequencies, the output voltage thus consisting of a pure square wave. The unavoidable commutating losses caused by the additional commutations are thus eliminated at higher working frequencies.

An inverter according to the invention thus provides, in a simple manner, continuously controllable output voltage with a low harmonic content within the entire control range. It is primarily intended to be supplied from a d.c. source having a constant voltage, which is favourable for the voltage supply of the commutating circuits included in the inverter.

Figure 2:
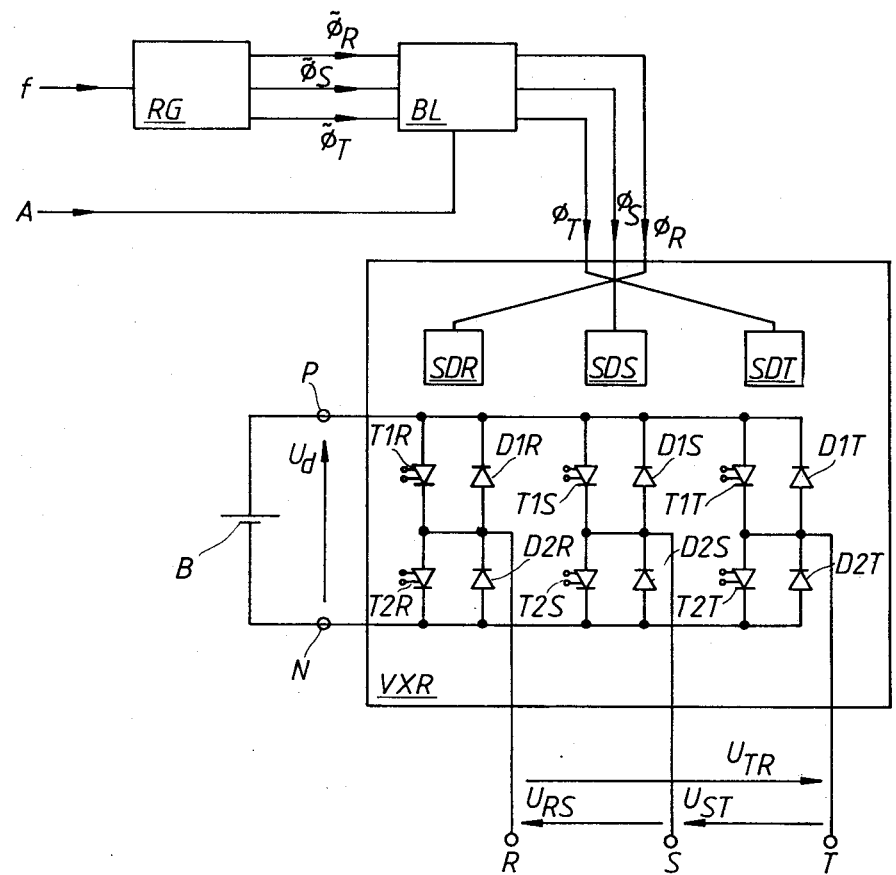
FIG. 2 is a circuit diagram of one embodiment of an inverter according to the invention.

FIG. 2 shows an inverter according to the invention. The inverter bridge proper, VXR, is a conventional three-phase bridge having six thyristors T1R, T2R, T1S, T2S, T1T, T2T and six diodes D1R, D2R, D1S, D2S, D1T, D2T. The thyristors may, for example, be conventional thyristors provided with turn-off circuits. The bridge has three phase groups, each having two thyristors for example T1R and T2R, connected in series with each other between the d.c. voltage connections P and N of the bridge, one of the phase conductors (R) for the output voltage of the inverter being connected to the point of connection of said thyristors (T1R and T2R).

Each phase group has a control pulse device, SDR, SDS and SDT, which controls the two main thyristors of the phase group and its commutating circuits in dependence on control signals $\phi_R$, $\phi_S$ and $\phi_T$ supplied to the control pulse device in such a manner that the thyristors in the phase group are alternately conducting. The construction and function of a phase group and its control pulse device will be described in more detail hereinafter with reference to FIGS. 3 and 4.

The inverter bridge has connection terminals P and N for connection to a d.c. voltage source B having a constant d.c. voltage $U_d$. Between the three phase terminals R, S, T of the bridge the three main voltages $U_{RS}$, $U_{ST}$ and $U_{TR}$ are obtained.

The inverter comprises a reference signal generator RG which generates the three-phase reference signal system $\tilde{\phi}_R$, $\tilde{\phi}_S$ and $\tilde{\phi}_T$. These reference signals provide the fixed control pattern described with reference to FIG. 1. A constant or variable control signal f is supplied to the reference signal generator, said signal f controlling the frequency of the reference signal system and thus also the frequency of the output voltage of the inverter.

The reference signals $\tilde{\phi}_R$, $\tilde{\phi}_S$ and $\tilde{\phi}_T$ are supplied to a mixing stage BL, in which the reference signal system is modulated in a manner described with reference to FIG. 1. A control signal A is supplied to the mixing stage and controls the pulse-width ratio of the modulating signal and thus the amplitude of the output voltage of the inverter. The mixing stage delivers the control signals $\phi_R$, $\phi_S$ and $\phi_T$ to the control pulse device of the inverter bridge.

Figure 3:
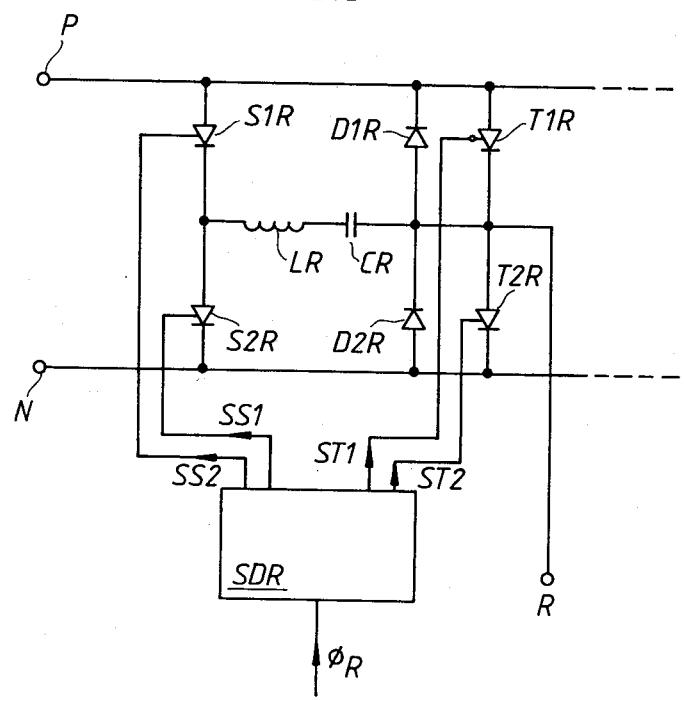
FIG. 3 is a circuit diagram of a phase of the inverter bridge of FIG. 2.

FIG. 3 shows one of the phase groups of the inverter bridge, namely that which is connected to the phase conductor R. The phase conductor is connected to the connection point between the two main thyristors T1R and T2R. The thyristors are connected in antiparallel with feedback diodes D1R and D2R. Between the two d.c. voltage poles P and N, two commutating thyristors S1R and S2R are connected, and between their connection point and the connection point of the main thyristors a commutating inductor LR and a commutating capacitor CR are interconnected. The control pulse device SDR delivers control signals to the main and commutating thyristors in dependence on the control signal $\phi_R$ supplied to the control pulse device.

The construction of the phase group and of its control pulse devices is known per se and may be arranged differently from the embodiment shown in FIG. 3. For example, the valves may be equipped with thyristors with turn-off means or transistors.

Figure 4:
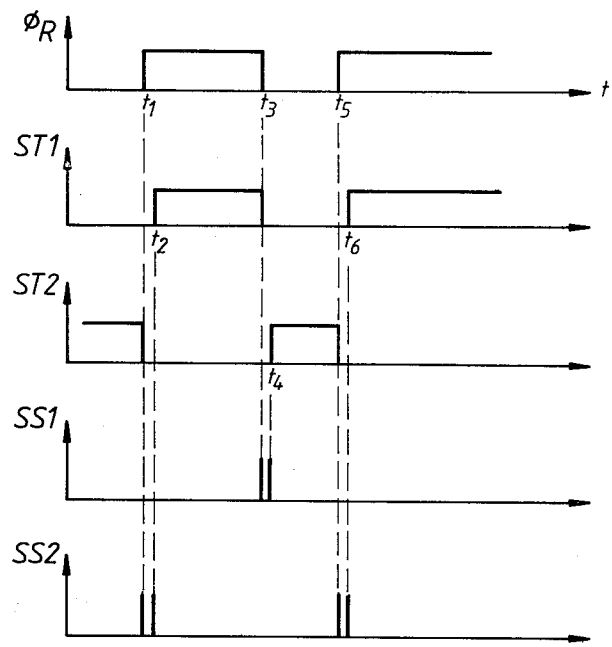
FIG. 4 is a series of graphs of the control signals used for controlling the phase of FIG. 3, FIGS. 5 and 6 are circuit diagrams of the reference signal generator and the mixing stage in the inverter according to FIG. 2.

FIG. 4 shows the mode of operation of the phase group. The uppermost graph shows an arbitrary control signal $\phi_R$ which is "1" between the times $t_1$ and $t_3$ and from the time $t_5$ onwards, and which is otherwise "0". At the time $t_1$ the control signal ST2 to the thyristor T2R, which was conducting previously, is interrupted. A short turn-off pulse SS2 is delivered to the turn-off thyristor S2R, the thyristor T2R thus being turned off. A short interval later, at that time $t_2$, a control signal ST1 is supplied for ignition of the thyristor T1R and at the same time a short control pulse to the turn-off thyristor S2R to charge the turn-off capacitor CR in a reliable manner. At the time $t_3$, $\phi_R = 0$. A control pulse is then supplied to the turn-off thyristor SR1, the thyristor T1R thus being turned off. A short interval later, at the time $t_4$, the thyristor T2R is ignited and a short control pulse is supplied to the turn-off thyristor S1R. At the time $t_5$, $\phi_R$ again becomes "1", the thyristor T2R being turned off and, at the time $t_6$, the thyristor T1R being ignited.

The result is that, if the potentials of conductors P and N are designated "1" and "0", the potential of the phase conductor R will follow the control signal $\phi_R$.

Figure 5:
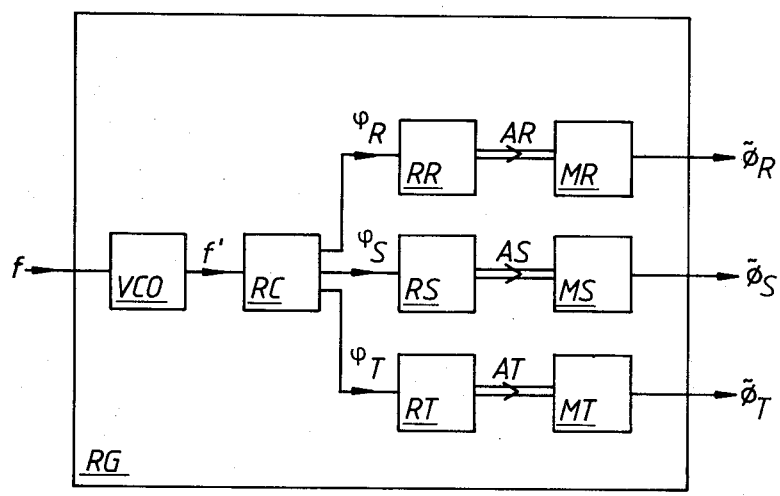

The reference signal generator RG is shown in FIG. 5. The analogue control voltage f for controlling the frequency of the inverter is supplied to a voltage-controlled oscillator VCO, which delivers a high-frequency pulse train with the frequency f' to a ring counter RC. The ring counter allocates the incoming pulses in successive order to its three outputs such that the output signals, the pulse trains $\phi_R$, $\phi_S$ and $\phi_T$, will be displaced in phase by the time 1/f' with respect to each other and each have the frequency f'/3. The three pulse trains from the ring counter are supplied to three counters RR, RS and RT, each having the capacity 3N. The counters are adapted constantly to operate displaced N units with respect to each other, which can be achieved, for example, by charging the counter RR with the amount of 3N, the counter RS with the amount 2N and the counter RT with the amount N upon start-up of the inverter. As soon as the contents of a counter have reached the capacity (3N) of the counter, the counter is set to zero and starts counting up from zero. The current contents AR, AS and AT of the counters are continuously supplied to three read-only memories MR, MS and MT and serve as addresses for the memories. Each memory has 3N cells, and the contents of each cell are either "0" or "1". While the counter counts up to 3N units, all the cells in the memory are successively read off, and the output signal from the memory varies in accordance with the programmed contents in the different cells of the memory. The three memories and their programmed contents are chosen such that the output signal ($\tilde{\phi}_R$, $\tilde{\phi}_S$ or $\tilde{\phi}_T$) constitutes a certain desired control pattern. These control patterns are chosen so that the main voltages of the inverter, if no modulation were carried out, would acquire the desirable harmonic-reducing appearance. An example of the control functions is shown in the uppermost three graphs of FIG. 7. The three control functions $\tilde{\phi}_R$, $\tilde{\phi}_S$ and $\tilde{\phi}_T$ are identical but are displaced 120° in phase relative to each other because of the phase displacement of the counters. These three control functions together constitute the three-phase reference signal, which is modulated at a later stage.

Figure 7:
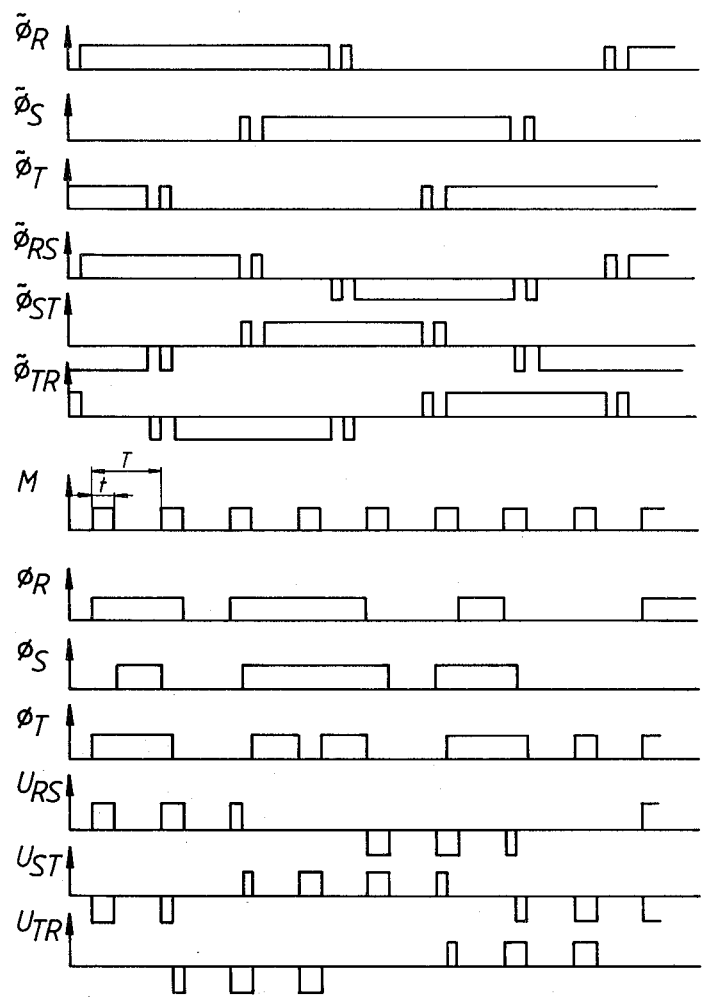
FIG. 7 is a series of graphs showing the more important signals and voltages occurring in the inverter plotted against time.

The three curves $\tilde{\phi}_{RS}$, $\tilde{\phi}_{ST}$ and $\tilde{\phi}_{TR}$ in FIG. 7 show the appearance the three main voltages of the inverter would acquire in the absence of a modulation (or with the pulse-width ratio $\alpha = 1$ of the modulating signal). For the curves the following relationships apply:

$$\tilde{\phi}_{RS} = \tilde{\phi}_R - \tilde{\phi}_S$$

$$\tilde{\phi}_{ST} = \tilde{\phi}_S - \tilde{\phi}_T$$

$$\tilde{\phi}_{TR} = \tilde{\phi}_T - \tilde{\phi}_R$$

The control functions shown are only examples and they may, in a simple manner, be given any appearance according to the desired degree and type of harmonic reduction.

The frequency of the output voltage of the inverter, with the reference signal generator according to FIG. 5, is as follows $$f = f'/9N$$

where 3N is the capacity of the counter.

Figure 6:
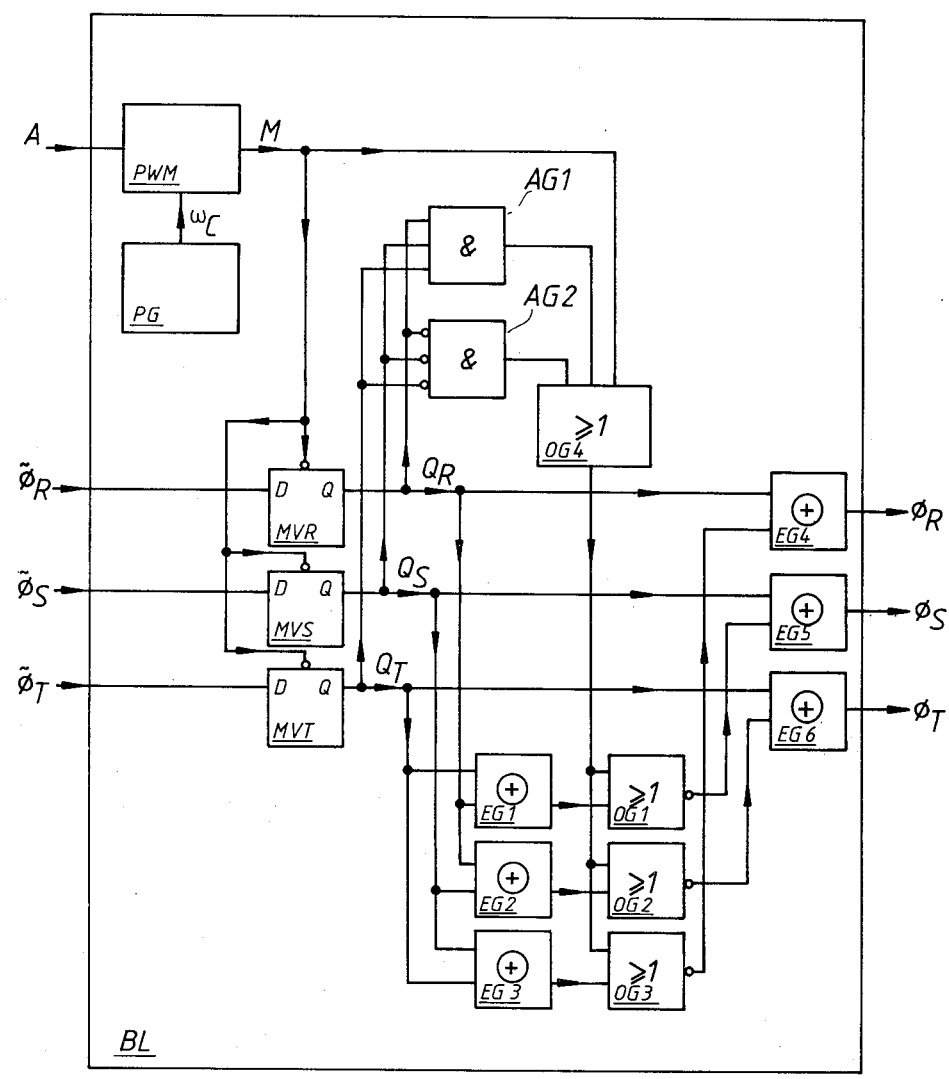

FIG. 6 shows the mixing stage for modulation of the three-phase reference signal $\tilde{\phi}_R$, $\tilde{\phi}_S$, $\tilde{\phi}_T$ with a modulating signal M. A pulse generator PG generates a pulse train with the frequency $\omega_c$ which, as mentioned above, for a three-phase inverter for a maximum of 50 Hz may be, for example, from 500 to 1000 Hz. The pulse train is supplied to a pulse-width modulator PWM. This delivers the modulating signal M which has the frequency $\omega_c$ and a pulse-width ratio $\alpha$ which may be varied by means of an amplitude control signal A.

The three reference signals $\tilde{\phi}_R$, $\tilde{\phi}_S$ and $\tilde{\phi}_T$ are fed to a latch register consisting of the flip-flops MVR, MVS and MVT. The modulating signal M is fed to auxiliary inputs on the flip-flops with the following mode of operation. When M becomes "0", the output signal from one flip-flop maintains its latest value for as long as M is "0" independent of variations of the input signal. When M is "1", the output signal from each flip-flop follows the input signal of the flip-flop, that is, $Q_R = \tilde{\phi}_R$, $Q_S = \tilde{\phi}_S$ and $Q_T = \tilde{\phi}_T$. The output signals are supplied to three exclusive OR-gates EG4, EG5 and EG6, the output signals $\phi_R$, $\phi_S$ and $\phi_T$ of which constitute the control signals which are supplied to the three control pulse devices SDR, SDS and SDT of the inverter bridge.

The output signals from the flip-flops in the latch register are supplied to two AND gates AG1 and AG2. The gate AG1 delivers a logical one if the output signals of all flip-flops are "1", and the gate AG2 delivers a logical one if the output signals of all flip-flops are "0". The output signals of the AND gates are supplied to an OR gate OG4 together with the modulating signal M.

The output signals of the flip-flops are supplied in pairs to three exclusive OR gates EG1, EG2 and EG3. The output signals from these gates, together with the output signal from the gate OG4, are supplied to three NOR gates OG1, OG2 and OG3, the output signals of which are supplied to the gates EG4, EG5 and EG6.

When M = 1, the output signal from the gate OG4 becomes "1" and the output signals from the gates OG1, OG2 and OG3 become "0". The following relationships then apply:

$$\phi_R = Q_R = \tilde{\phi}_R$$

$$\phi_S = Q_S = \tilde{\phi}_S$$

$$\phi_T = Q_T = \tilde{\phi}_T$$

that is, the three control signals $\phi_R$, $\phi_S$, $\phi_T$ will follow the reference signals $\tilde{\phi}_R$, $\tilde{\phi}_S$ and $\tilde{\phi}_T$.

When M becomes "0", the three signals $Q_R$, $Q_S$ and $Q_T$ are locked at the values they have at that time, as mentioned above. If not all of these three signals are equal, two of the signals have the same value and the third has the opposite value, which means that two of the phase terminals of the inverter bridge are connected to one d.c. voltage pole and the third phase terminal is connected to the other d.c. voltage pole. If, for example, $Q_R = Q_T$, the output signal from the gate EG1 becomes "0" and from the gate OG1 "1". This means that the signal $Q_S$ is inverted in the gate EG5 such that $\phi_S = \overline{Q_S}$. This means that phase S in the inverter bridge is commutated, and therefore all the phase conductors R, S, T of the inverter bridge will be connected to the same d.c. voltage pole, which means that all the main voltages from the bridge becomes zero as soon as the modulating signal M has become zero and remain zero as long as M remains zero.

If, when M becomes zero, all the three signals $Q_R$, $Q_S$ and $Q_T$ are equal, the output signal from either the gate AG1 or the gate AG2 becomes "1" and thus also the output signal from the gate OG4 becomes "1". This prevents inversion of the output signals $\phi_R$, $\phi_S$, $\phi_T$. No commutation is therefore performed, nor is commutation necessary since all the main voltages of the inverter bridge are already zero when M becomes zero.

The result of the operating procedure described in connection with the mixing circuit BL is that, when M is "1", the control signals $\phi_R$, $\phi_S$ and $\phi_T$ and thus the output voltages of the inverter bridge follow the reference signals $\bar{\phi}_R$, $\bar{\phi}_S$, $\bar{\phi}_T$ from the reference signal generator RG. When M is "0" all the three phase conductors of the inverter bridge are connected to the same d.c. pole and the main voltages of the inverter are zero.

FIG. 7 shows an arbitrarily chosen modulating signal M with the pulse-width ratio $\alpha = t/T$. For the sake of clarity, the modulating signal is shown with a low pulse frequency. The control signals $\phi_R$, $\phi_S$ and $\phi_T$ which correspond to the modulating signal and the reference signal system $\bar{\phi}_R$, $\bar{\phi}_S$, $\bar{\phi}_T$ are also shown in FIG. 7 as well as the output voltages (main voltages) of the inverter, $U_{RS}$, $U_{ST}$ and $U_{TR}$.

In the preferred embodiment of the invention described above, commutation of more than one single phase of the inverter bridge is never carried out when M becomes "0". This gives a minimum of commutations and the commutating losses of the inverter are low. Alternatively, this advantage may be expressed in such a way that with a certain highest tolerable commutating frequency with respect to the commutating losses, the inverter is capable of working with the highest possible frequency of the modulating signal, which results in a harmonic spectrum, caused by the modulation, of a higher frequency which can be removed more easily by filtering.

What is claimed is:

1. An electrical inverter for providing an output voltage having a low harmonic content and which is controllable in relation to the input voltage to the inverter, comprising a three-phase inverter bridge for connection to a d.c. voltage source, control pulse means for controlling the valves of the bridge, and mixing means supplied with a three-phase binary reference signal which controls the curve shape of the inverter output voltage for mixing the reference signal with a binary pulse train to produce a resultant signal, said reference signal comprising both fundamental commutations and additional commutations for reducing the harmonic content of the inverter output voltage, said binary pulse train having a controllable pulse-width ratio and a frequency which is higher than the frequency of the inverter output voltage, said resultant signal being supplied to said control pulse means so that the inverter output voltage comprises the product of the reference signal and the binary pulse train.

2. An inverter according to claim 1, in which said mixing members are adapted, when the binary pulse train assumes a first of its two possible values, to forward the reference signal to said control pulse means for controlling the output voltage of the inverter in dependence on the reference signal and, when the binary pulse train assumes its second value, to control the valves of the inverter bridge such that all the a.c. voltage outputs of the bridge are connected to the same pole of the d.c. voltage source.

3. An inverter according to claim 2, in which said mixing members are adapted, when the binary pulse train changes from said first to said second value and if then a single one of the a.c. voltage terminals of the bridge is connected to one of the poles of the d.c. voltage source, to commutate the phase to which the a.c. voltage terminal belongs.

4. An inverter according to claim 1, comprising a pulse generator adapted to be supplied with an amplitude reference value and to generate a pulse train having a pulse width ratio which corresponds to said reference value, the pulse train generated by the pulse generator thus constituting said binary pulse train and being adapted to be supplied to said mixing members.

* * * * *